(12) United States Patent
Berenda et al.

(10) Patent No.: US 7,538,447 B1
(45) Date of Patent: May 26, 2009

(54) ENERGY RECOVERY SYSTEM INCLUDING A FLOW GUIDE APPARATUS

(76) Inventors: Robert M. Berenda, 4233 Haut Brion Ct., Allison Park, PA (US) 15101; Jack E. Ferenci, 203 Colvin Run Rd., Grindstone, PA (US) 15442

( * ) Notice: Subject to any disclaimer, the term of this patent is extended or adjusted under 35 U.S.C. 154(b) by 0 days.

(21) Appl. No.: 12/074,684

(22) Filed: Mar. 5, 2008

(51) Int. Cl.
*F03D 9/00* (2006.01)

(52) U.S. Cl. .................................................. 290/55
(58) Field of Classification Search ............. 290/55
See application file for complete search history.

(56) References Cited

U.S. PATENT DOCUMENTS

| | | | |
|---|---|---|---|
| 1,013,798 A | | 1/1912 | Messina |
| 1,876,595 A | | 9/1932 | Beldimano |
| 2,004,853 A | | 6/1935 | Crary |
| 3,720,840 A | | 3/1973 | Gregg |
| 3,936,652 A | | 2/1976 | Levine |
| 4,021,135 A | * | 5/1977 | Pedersen et al. ......... 415/208.2 |
| 4,087,196 A | | 5/1978 | Kronmiller |
| 4,087,927 A | | 5/1978 | Basmajian |
| 4,140,433 A | * | 2/1979 | Eckel ...................... 415/209.1 |
| 4,154,556 A | | 5/1979 | Webster |
| 4,159,426 A | | 6/1979 | Staton |
| 4,220,870 A | | 9/1980 | Kelly |
| 4,379,236 A | * | 4/1983 | Inoue .......................... 290/55 |
| 5,007,241 A | | 4/1991 | Saitou |
| 5,272,378 A | | 12/1993 | Wither |
| 5,512,788 A | | 4/1996 | Berenda et al. |
| 5,998,882 A | * | 12/1999 | Alston ......................... 290/54 |
| 6,365,985 B1 | * | 4/2002 | Cohen ......................... 290/55 |
| 7,200,005 B2 | * | 4/2007 | Von Gutfeld et al. ........ 361/695 |
| 7,208,846 B2 | * | 4/2007 | Liang ......................... 290/1 R |
| 2007/0013196 A1 | * | 1/2007 | Chen ......................... 290/55 |
| 2008/0209940 A1 | * | 9/2008 | Whisson ...................... 62/467 |

FOREIGN PATENT DOCUMENTS

| | | | | |
|---|---|---|---|---|
| JP | 2002054553 A | * | 2/2002 | |
| JP | 2005016452 A | * | 1/2005 | |
| JP | 2005036780 A | * | 2/2005 | |
| JP | 2005248821 A | * | 9/2005 | |
| JP | 2007023777 A | * | 2/2007 | |
| SU | 123182 A1 | * | 7/1986 | |

OTHER PUBLICATIONS

Green Energy Technologies, brochure and website materials.

* cited by examiner

*Primary Examiner*—Joseph Waks
(74) *Attorney, Agent, or Firm*—Buchanan Ingersoll & Rooney PC

(57) ABSTRACT

An energy recovery system includes a ventilation system of a defined area, at least one windmill located exterior to the defined area and at least one flow guide apparatus positioned between the at least one exhaust and the at least one windmill. The ventilation system has at least one exhaust from which air from within the defined area is expelled out of the defined area by an exhaust fan as an exhaust air flow. The one or more flow guide apparatuses are positioned between the exhaust and the one or more windmills and are preferably sized and configured to redirect at least a portion of the exhaust air flow into an axial flow that moves toward one or more of the windmills.

18 Claims, 4 Drawing Sheets

Figure 1 *[PRIOR ART]*

ENERGY RECOVERY SYSTEM INCLUDING A FLOW GUIDE APPARATUS

FIELD OF INVENTION

The invention relates generally to capturing energy contained in an exhaust air flow of a ventilation system.

BACKGROUND OF THE INVENTION

Air flow is one of the oldest sources of energy used by man, but even today it is one of the least researched suppliers of energy. Recently, windmills have been used as a source for generating electrical energy. One advantage of wind driven power stations is their environmental friendliness. A wind utilizing power station consumes no raw materials nor does it give off waste gases or waste materials. Further, wind utilizing power devices generally produce relatively little noise in their operation.

Wind utilizing devices of the type having a turbine have been disclosed in U.S. Pat. No. 2,004,853 to Crary. Such turbines have blades or vanes attached to a rotatable shaft in which the vanes are driven by the wind. The shaft is coupled to an electric power generating device. Such wind utilizing devices are often referred to as windmills.

Some windmills have been specially adapted to increase electrical output. U.S. Pat. No. 3,720,840 discloses one such adapted windmill. These adaptations include making the position of the fluid inlet adjustable and utilizing a heating unit to increase fluid flow through the device.

Another windmill device, which has been developed by Green Energy Technologies of Cleveland, Ohio, includes a windmill that is often located on tall buildings and is positioned on a turnstile. Such windmills may include a collector or shroud that helps increase the velocity of the wind passing through the vanes of the windmill. The turnstile of such devices is typically configured to permit the windmill to move into the direction that the wind may be blowing to collect an air flow sufficient to rotate the vanes of the windmill to generate electricity.

Attempts have also been made to utilize secondary air currents in connection with windmill type devices to generate power. For example, U.S. Pat. No. 3,936,652 discloses a power plant that has air inlet ducts connected to a cooling tower. As hot air flows out of a vertical tower, the hot air is sucked into the inlet ducts. The flow of the hot air in the inlet ducts turns windmill devices provided in the inlet ducts.

More recently, a system that utilizes waste or exhaust air flow from one or more ventilation systems of a defined area, such as a mine, has been disclosed. For example, U.S. Pat. No. 5,512,788 to Berenda et al. discloses such a system. The entirety of U.S. Pat. No. 5,512,788 is hereby incorporated by reference herein. U.S. Pat. No. 5,512,788 discloses an exhaust air recovery system that utilizes wasted or exhausted air flow from one or more ventilation systems from a mine, tunnel, or other area requiring ventilation. The exhaust fan expels air causing air velocities to be directed out of the area requiring ventilation. The exhaust air from the one or more ventilation systems is captured and converted to electrical energy by one or more windmills or other devices configured to utilize an air flow to generate electricity.

The system disclosed in U.S. Pat. No. 5,512,788, however, has been found to include problems that need resolved. For example, we have conducted studies of the air flow from ventilation exhaust systems used in mines and tunnels and found that the exhaust air flow is often not a laminar flow. The exhaust stream may include a vortex in the air flow. Moreover, turbulence is often caused when the exhaust air flow impacts the earth or other objects after the air flows beyond the exhaust of the one or more ventilation systems. We have found that such turbulent flow is not necessarily ideal for recovering energy from the exhaust air flow. Further, particles from the earth or other debris may enter the air flow and be directed toward a windmill positioned to utilize the exhaust flow. Such debris may damage the windmill or increase the maintenance costs for the windmill.

We have found that a system of recovering energy from a ventilation system should include a device that can help recover the energy provided by an exhaust air flow as efficiently as possible with windmill technology. Such a device should be configured to control the turbulence and tangential flow of the exhaust air flow. The device is preferably configured so at least a portion of the exhaust air flow is redirected toward a windmill in an axial direction. Such a device and the windmill of the system are also preferably positioned far enough away from the exhaust of the one or more ventilation systems so that no back pressure on a ventilation fan or exhaust fan is created.

SUMMARY OF THE INVENTION

We provide an energy recovery system that includes a flow guide apparatus. The system includes a ventilation system of a defined area that has at least one exhaust, one or more windmill devices located exterior to the defined area, and at least one flow guide apparatus. The windmill device is spaced a selected distance from the one or more exhausts. The flow guide apparatus is positioned between the windmill and the exhaust. Preferably, the one or more flow guide apparatuses are positioned in a portion of the selected distance between the one or more windmills and the one or more exhausts so that no back pressure is exerted on the exhaust fan by the one or more flow guide apparatuses.

In some embodiments, the one or more windmills may include a plurality of windmills arranged in an array. One or more of the windmills may include a rotatable shaft, a plurality of vanes and an electrical generator connected to the rotatable shaft so that rotation of the shaft causes electricity to be generated. The plurality of vanes can be configured to rotate when the exhaust air flow flows or acts on the vanes.

The defined area may be a mine, a tunnel, or other bounded or enclosed area that may need ventilation. Preferably, the exhaust fan is a fan that operates at least at 50,000 cubic feet per minute (CFM).

Embodiments of our energy recovery system may also include a feed configured to connect the electrical generator of one or more of the windmills to a power system, to the ventilation electrical system feed for the ventilation system, or to both the power system and the ventilation electrical system feed. It should be understood that such connections can permit the windmills to provide power to the ventilation system or the power system.

Preferably, the one or more flow guide apparatuses are each sized and configured to redirect at least a portion of the exhaust air flow into an axial flow and streamline turbulence that may result when portions of the exhaust air flow impacts objects outside the defined area between the flow guide apparatus and the exhaust. In one embodiment, the one or more flow guide apparatuses are sized and configured to redirect at least a portion of the exhaust air flow into an axial and/or laminar flow of fluid that moves toward the one or more windmills.

In some embodiments, the one or more flow guide apparatuses can include a body and a plurality of guide vanes. The body may have a first side and a second side. Each guide vane may have a proximate end attached to the body and a distal end that extends away from the body. The first side of the body, second side of the body, or both may have a portion that defines a nose cone.

Some embodiments of the flow guide apparatus may include a circular or generally rectangular member that is attached to one or more of the guide vanes. The member may be composed of one or more interconnected portions or be an integrally formed structure. Preferably, the member encircles the distal end of most, if not all, of the guide vanes.

The one or more flow guide apparatuses may also include a base that is connected to at least one of the body, one or more of the guide vanes and a member. Preferably, the base is configured to support the body and guide vanes at a position outside the defined area between the one or more windmills and the one or more exhausts.

Other details, objects, and advantages of the invention will become apparent as the following description of certain present preferred embodiments and methods of practicing the invention proceeds.

BRIEF DESCRIPTION OF THE DRAWINGS

In the accompanying drawings we have illustrated certain present preferred embodiments of our energy recovery system and methods of practicing the same.

DETAILED DESCRIPTION OF PRESENT PREFERRED EMBODIMENTS

In certain bounded areas, or defined areas, there is little or no natural replenishing of the fresh air supply. In other defined areas, there may be potentially harmful gases or vapors that accumulate. Such defined areas can include without limitation mines, tunnels, certain factories and portions of such areas. These defined areas typically have ventilation systems that are configured to replenish the fresh air supply of the area. Such ventilation systems often include one or more ventilation or exhaust fans that are configured to expel fresh air through the bounded area and ventilate stale air out of, or outward of, the defined area. Such stale air is typically expelled from one or more exhausts.

Exhaust fans often have a wind tunnel-like body that has an intake end and an opposed discharge end. The flow of air through the fan during exhaust operation flows in a direction from the intake end through and away from the discharge end. Thus, air flow is drawn into the intake end and is expelled out of the discharge end. For exhaust operation, the intake end is provided within and typically connected to the containing structure of the bounded area, or defined area. The discharge end, or exhaust, opens to ambient air at an exhaust location outside of the defined area.

The length and pitch of the exhaust fan blades, the horsepower of the motor driving the exhaust fan and the dimensions of the exhaust fan are each design factors that determine the volume of air flow that an exhaust fan can deliver. Generally, industrial exhaust fans used in mines, tunnels and other defined areas require an exhaust air flow of between 50,000 and 1,000,000 CFM.

Figure 1:
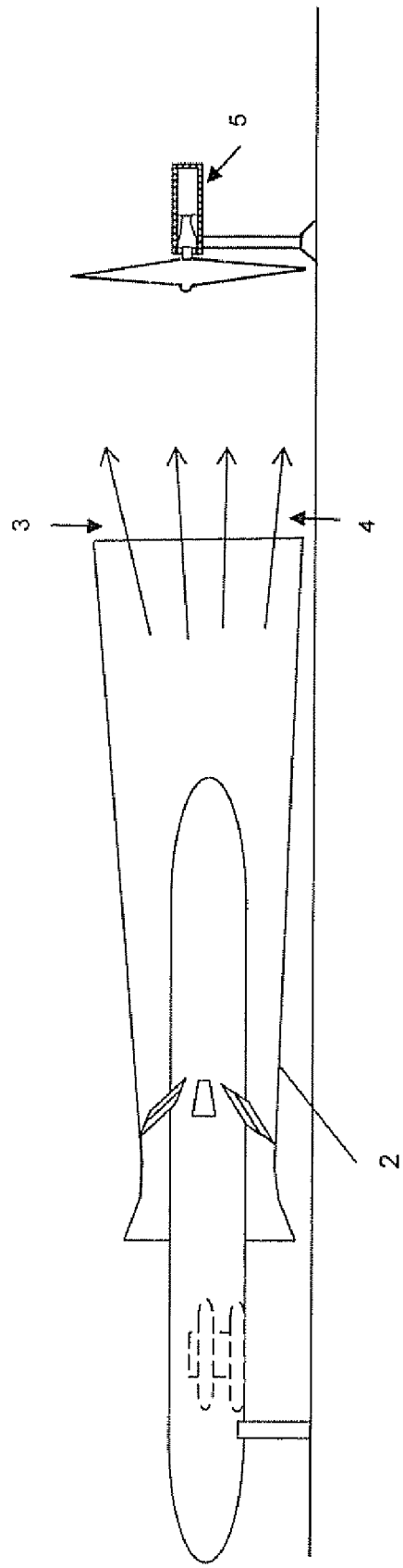
FIG. 1 is a side view of an exhaust air flow that has been found to be expelled out of a ventilation system.

The air expelled out of an exhaust, or exhaust air flow, may be utilized to generate electricity using windmills. Studies we conducted of the air flow from ventilation exhaust systems used in mines and tunnels have found that the exhaust air flow is often not a laminar flow. FIG. 1 is one representation of an exhaust air flow that has been found to be expelled from a ventilation system.

The exhaust air flow 1 shown in FIG. 1 is expelled out of an exhaust 2. The exhaust air flow 1 often includes a vortex 3 in the air flow. Moreover, turbulence 4 is often caused when one or more portions of the exhaust air flow impacts the earth after the exhaust air flow flows beyond the exhaust of the one or more ventilation systems. Such turbulent flow is not ideal for recapturing the energy from the exhaust with a windmill. Further, particles from the earth or other debris may enter the air flow and be directed toward a windmill positioned to utilize the exhaust flow. Such debris may damage a windmill 5 positioned to generate electricity from the exhaust air flow or increase the maintenance costs for the windmill.

The above findings illustrated in FIG. 1 were surprising. It was expected that the flow expelled from a ventilation system was typically a laminar flow that was symmetrical. The expectation of a laminar and symmetrical flow was initially found to be a typical exhaust air flow of certain ventilation systems we studied in the early and mid 1990s. However, either due to more powerful exhaust fan systems, experimental error, or other factors, we have determined that many ventilation systems currently have exhaust air flows that are not symmetrical and include turbulence.

Such turbulent and asymmetrical flows are often not ideal for driving the vanes of a windmill. We have found that a laminar flow acts against the vanes of a windmill or flows against the vanes of a windmill to drive the windmill and generate electricity much more efficiently than turbulent exhaust air flows. As a result of these discoveries, we have determined that a device is needed that is configured to redirect the tangential velocity component of turbulent or vortex containing exhaust air flows into an axial flow that is directed toward the windmill. The device also preferably streamlines the turbulence that may result from portions of the exhaust air flow impacting surrounding objects such as dirt, earth, rocks, or other matter that may be located between an exhaust and the device.

Figure 2:
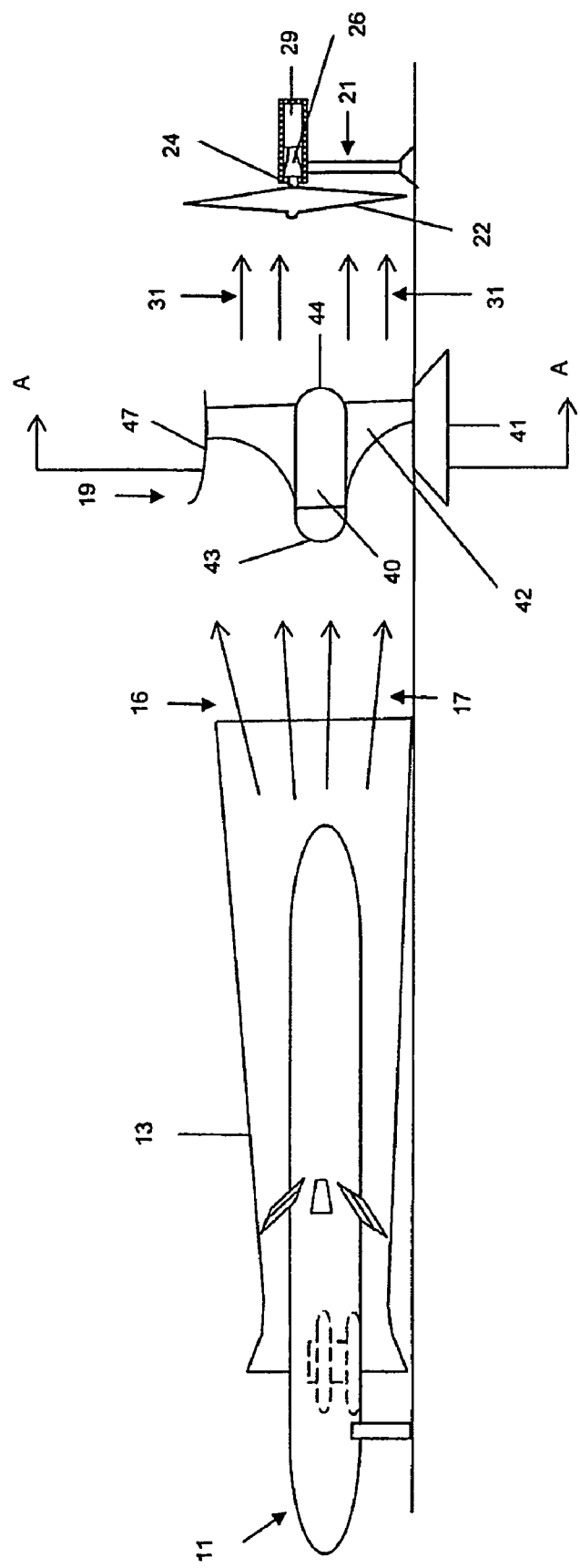
FIG. 2 is a side view of a first present preferred embodiment of our energy recovery system illustrating a first present preferred flow guide apparatus and first present preferred windmill positioned a selected distance away from an exhaust of a ventilation system.

Referring to FIG. 2, a first present preferred embodiment of a system for recovering energy is illustrated that shows a flow guide apparatus 19 positioned between an exhaust 13 and a windmill 21. An exhaust fan 11 expels air through a defined area and out of the defined area through the exhaust 13. The air expelled out of the exhaust 13 includes an exhaust air flow 15. The exhaust air flow has one or more vortex portions 16 and also one or more turbulent flow portions 17. The turbulent flow portions 17 are often caused from impacting the earth or other objects between the exhaust 13 and the flow guide apparatus 19.

The flow guide apparatus 19 is sized and configured so that it receives at least a portion of the exhaust air flow and redirects the tangential velocity component of the exhaust air flow into an axial flow 31 that is directed toward the windmill 21. Preferably, the flow guide apparatus 19 is configured so that the directed axial flow 31 is a laminar flow.

The windmill 21 has a plurality of vanes 22 that are connected to a gear box 26 and electric generator 29 by a rotatable shad 24. As the directed exhaust air flow flows against the vanes 22, or acts against the vanes 22, the vanes 22 rotate, which rotates the rotatable shaft 24. Rotation of the shaft 24 causes the electrical generator 29 to generate electricity.

Figure 3:
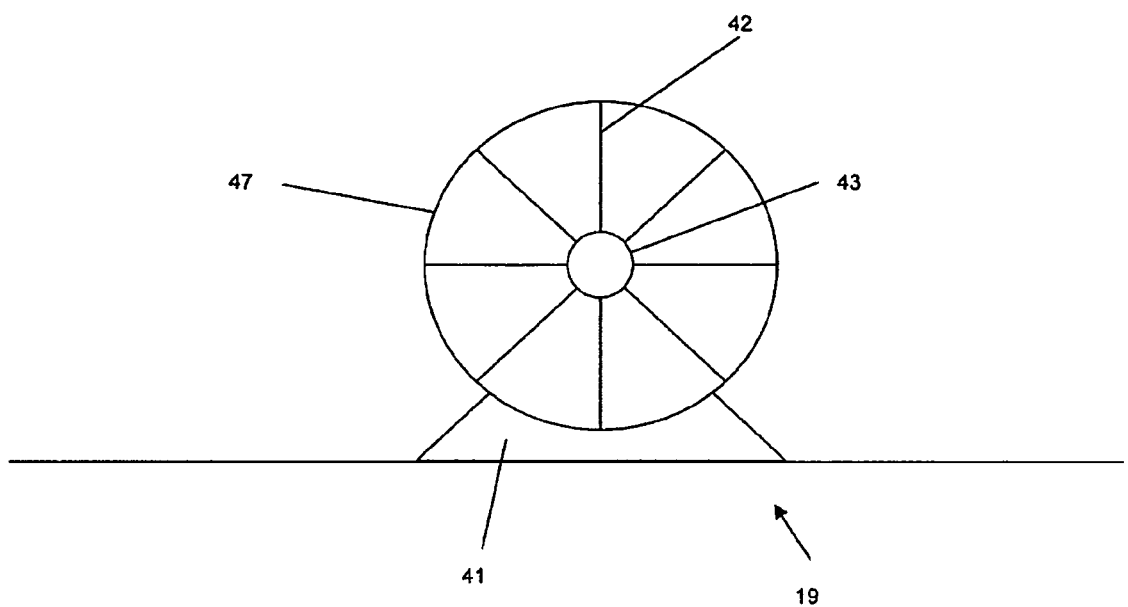
FIG. 3 is a cross section view of the first present preferred flow guide apparatus taken along line A-A in FIG. 2.
Figure 4:
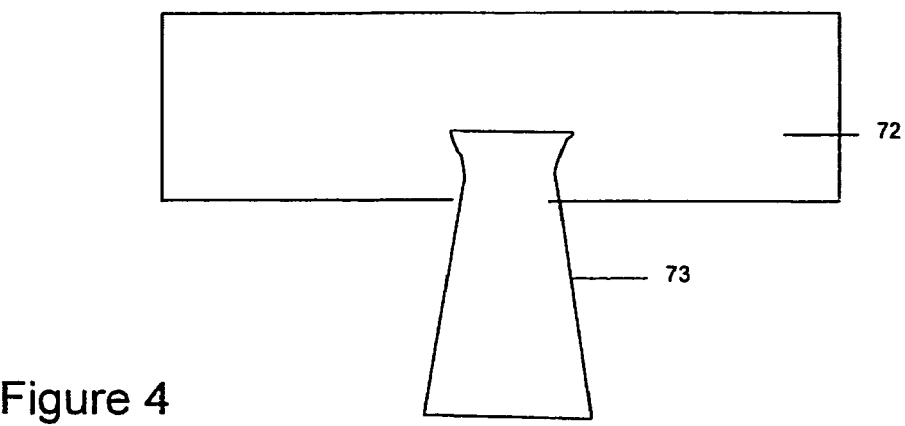
FIG. 4 is a schematic depiction of a second present preferred embodiment of our energy recovery system.

As may best be appreciated from FIGS. 2 and 3, the flow guide apparatus 19 can include a plurality of guide vanes 42 connected to a body 40. The guide vanes 42 can each include a proximate end 51 attached to the body 42 and a distal end 52 that extends away from the body. The body 40 has a first side 43 that faces toward the exhaust 13 and a second side 44 that faces toward the windmill 22. Preferably, at least a portion of the first side 43 of the body 40 and second side 44 of the body 40 define a nose cone. The body 40 may be a unitary structure or composed of multiple interconnected structures.

A member 47 encircles the guide vanes 42. In alternative embodiments, the member 47 may encircle only some of the guide vanes 42. The member 47 may be a unitary structure or a structure that includes multiple interconnected members. Preferably, the member 47 is a unitary structure that is circular or generally rectangular. The member 47 may be connected to the distal end 52 of each guide vane 42, may be connected to one or more of the distal ends 52, or may be configured to encircle one or more of the guide vanes 42 without engaging some or all of those guide vanes such that a gap is formed between the distal end 52 of at least some of the guide vanes and the member 47.

It should be understood that the member 47 may be configured to extend from beyond the first side 43 of the body to a position beyond the second side 44 of the body such that the member 47 is much longer or wider than the body 40 or guide vanes 42. In one embodiment, the member 47 may extend from adjacent the guide vanes 42 to a location that is near or otherwise adjacent to the vanes 22 of the windmill 21.

The member 47 is sized and configured to retain a portion of the exhaust air flow and direct that portion to the windmill 21. The guide vanes 42, body 40 and member 47 are configured to control or direct the turbulence portion of the exhaust air flow and streamline the flow toward the windmill 21. The flow guide apparatus 19 may also be sized and configured to prevent at least a portion of any debris within the exhaust air flow from contacting the windmill 21.

A base 41 is connected to the member 47 and may also be configured for attachment to one or more of the guide vanes 42 or the body 40. The base 41 is configured to support the flow guide apparatus 19. Preferably the base is positioned below the top surface of the ground so that the top surface of the base is even with the top surface of the ground. Of course, the base may also be positioned on the ground or on a platform or foundation located on or under the ground.

Embodiments of our energy recovery system may also include multiple windmills and multiple flow guide apparatuses. For example, a second present preferred embodiment of our system may include multiple flow guide apparatuses 79 aligned in an array and multiple windmills 61 aligned in an array such that each windmill is also aligned with a respective flow guide apparatus 79.

Exhaust air flow 75 is expelled out of a defined area 72 through an exhaust 73. The exhaust air flow is directed toward the windmills 61 by the flow guide apparatuses 79. The directed exhaust air flow that passes through the flow guide apparatuses 79 flows against the vanes of the windmills 61, causing the vanes to rotate and the electrical generator 65 of each windmill 61 to generate electricity.

Of course, in alternative embodiments one flow guide apparatus may be sized and configured for alignment with two or more windmills 61 to direct the exhaust air flow to the windmills.

Figure 5:
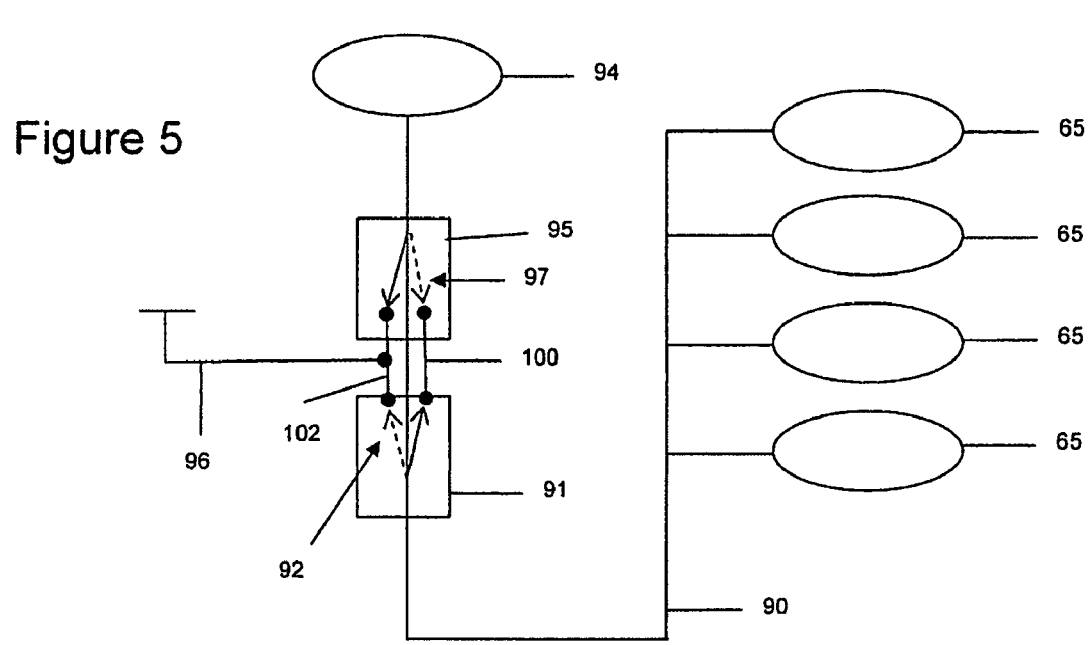
FIG. 5 is a diagrammatic depiction of the electrical wiring of the second present preferred embodiment of our energy recovery system.

As may be seen in FIG. 5, the electrical wiring of the second present preferred embodiment is illustrated. Current flow of the electricity generated by the respective generators 65 may travel through wiring 90 into a generator control 91. The generator control 91 can include one or more switches 92 or other switching means. Depending on the position of the one or more switches, the electrical current may travel to the exhaust fan motor control 95 or may alternatively travel to a power system through a power line 96. The exhaust fan motor control 95 can also include one or more switches 97 or other switching means so that the exhaust fan may receive electrical power from the electrical generators 65, a power line 96, or both.

When the one or more switches 92 are in the position shown in dotted line in FIG. 5, the current from the electrical generators 65 may travel along wiring 102 to power line 96 and, ultimately, to a power system. For such a configuration of one or more switches 92, the one or more switches 97 of the exhaust fan control is configured as shown in solid line 102 to receive current from power line 96.

When the one or more switches 92 and 97 are configured so current is sent from the electrical generators 65 to the exhaust fan motor control 95 to power exhaust fan 94, the switch or switches are configured to send the current as shown in line 100 in FIG. 5 so that the electrical current flows to the exhaust fan motor control 95. Of course, the one or more switches 97 and the exhaust fan motor control 95 may also be configured to receive current from both line 100 and line 102 to power the exhaust fan 94.

It should be appreciated that variations of the present preferred embodiments discussed above may be made. For example, the ventilation system has been shown as employing only one exhaust fan, but two or more exhaust fans may also be used. As another example, any number of windmills may be used in connection with any number of flow guide apparatuses.

While we have shown and described certain present preferred embodiments of our energy recovery system and methods of practicing the same, it is to be distinctly understood that the invention is not limited thereto but may be otherwise variously embodied and practiced within the scope of the following claims.

We claim:

1. An energy recovery system comprising:
   a ventilation system of a defined area, the ventilation system having at least one exhaust wherein air from within the defined area is expelled outward of the defined area by at least one exhaust fan as an exhaust air flow that flows out of the at least one exhaust;
   at least one windmill located exterior to the defined area and being a selected distance from the at least one exhaust,
   at least one flow guide apparatus positioned between the at least one exhaust and the at least one windmill, the at least one flow guide apparatus comprised of a body having a first side and a second side and a plurality of guide vanes, each guide vane having a proximate end attached to the body and a distal end that extends away from the body;
   wherein each windmill is comprised of:
   a rotatable shaft,
   a plurality of vanes connected to the rotatable shaft such that rotation of the vanes causes the rotatable shaft to rotate, and an electrical generator connected to the rotatable shaft such that rotation of the rotatable shaft causes electricity to be generated, wherein the plurality of vanes are configured to rotate when the exhaust air flow flows on the vanes.

2. The energy recovery system of claim 1 wherein the defined area is a mine.

3. The energy recovery system of claim 1 wherein the defined area is a tunnel.

4. The energy recovery system of claim 1 wherein the at least one windmill is a plurality of windmills arranged in an array.

5. The energy recovery system of claim 1 wherein the ventilation system is comprised of at least one exhaust fan operating at least at 50,000 CFM.

6. The energy recovery system of claim 1 further comprising a feed configured to connect the electrical generator of the at least one windmill to a power system.

7. The energy recovery system of claim 1 further comprising a feed configured to connect the electrical generator of the at least one windmill to a ventilation electrical system feed for the ventilation system.

8. The energy recovery system of claim 1 wherein the at least one flow guide apparatus is sized and configured to redirect at least a portion of the exhaust air flow into an axial flow and streamline turbulence resulting from when the exhaust air flow impacts objects located between the at least one exhaust and the at least one flow guide apparatus.

9. The energy recovery system of claim 1 wherein at least a portion of the first side of the body defines a nose cone and at least a portion of the second side of the body defines a nose cone.

10. The energy recovery system of claim 9 wherein the at least one flow guide apparatus is further comprised of a base connected to at least one of the body and at least one guide vane.

11. The energy recovery system of claim 1 wherein the at least one flow guide apparatus is also comprised of a circular member or a generally rectangular member that is connected to the distal end of each guide vane.

12. The energy recovery system of claim 1 wherein the at least one flow guide apparatus is also comprised of a circular member or a generally rectangular member that is connected to the distal end of at least one of the guide vanes.

13. The energy recovery system of claim 1 wherein at least one of the second side of the body and the first side of the body defines a nose cone.

14. An energy recovery system comprising:
a ventilation system of a defined area, the ventilation system having at least one exhaust wherein air from within the defined area is expelled outward of the defined area by at least one exhaust fan as an exhaust air flow that flows out of the at least one exhaust;
at least one windmill located exterior to the defined area and being a selected distance from the at least one exhaust,
at least one flow guide apparatus positioned between the at least one exhaust and the at least one windmill wherein the at least one flow guide apparatus is comprised of:
a body having a first side and a second side opposite the first side,
a base connected to the body,
a plurality of guide vanes, each guide vane having a proximate end attached to the body and a distal end that extends away from the body, and
a member connected to at least one of the body, the base and at least one of the guide vanes,
wherein the first side of the body faces toward the at least one exhaust and the second side of the body faces toward the at least one windmill, the first side of the body defining a first generally circular tapered end of the body and the second side of the body defining a second generally circular tapered end of the body; and
wherein the at least one flow guide apparatus is sized and configured to redirect at least a portion of the exhaust air flow into an axial flow of fluid that moves toward the at least one windmill.

15. The energy recovery system of claim 14 wherein the member is a circular member or a generally rectangular member.

16. The energy recovery system of claim 14 wherein the at least one flow guide apparatus is also sized and configured to streamline turbulence resulting from when the exhaust air flow impacts objects outside the defined area between the at least one exhaust and the at least one flow guide apparatus.

17. An energy recovery system comprising:
a ventilation system of a defined area, the ventilation system having at least one exhaust wherein air from within the defined area is expelled outward of the defined area by at least one exhaust fan as an exhaust air flow that flows out of the at least one exhaust;
at least one windmill located exterior to the defined area and being a selected distance from the at least one exhaust, each windmill comprising:
a rotatable shaft,
a plurality of vanes connected to the rotatable shaft such that rotation of the vanes causes the rotatable shaft to rotate, and
an electrical generator connected to the rotatable shaft such that rotation of the shaft causes electricity to be generated,
wherein the plurality of vanes are configured to rotate when the exhaust air flow flows on the vanes;
the energy recovery system also comprising at least one flow guide apparatus positioned between the at least one exhaust and the at least one windmill wherein the at least one flow guide apparatus is comprised of:
a body having a first side and a second side opposite the first side,
a base connected to the body,
a plurality of guide vanes, each guide vane having a proximate end attached to the body and a distal end that extends away from the body, and
a member connected to at least one of the body, the base and at least one of the guide vanes,
wherein the first side of the body faces toward the at least one exhaust and the second side of the body faces toward the at least one windmill, at least a portion of the first side of the body defining a first tapered end of the body and at least a portion of the second side of the body defining a second tapered end of the body; and
wherein the at least one flow guide apparatus is sized and configured to redirect at least a portion of the exhaust air flow into an axial flow that moves toward the at least one windmill.

18. The energy recovery system of claim 17 wherein the at least one flow guide apparatus is also sized and configured so the axial flow is a laminar flow of fluid.

* * * * *

UNITED STATES PATENT AND TRADEMARK OFFICE
CERTIFICATE OF CORRECTION

PATENT NO. : 7,538,447 B1
APPLICATION NO. : 12/074684
DATED : May 26, 2009
INVENTOR(S) : Robert M. Berenda and Jack E. Ferenci It is certified that error appears in the above-identified patent and that said Letters Patent is hereby corrected as shown below:

In the Specifications:

Column 5, line 3, change "shad" to --shaft--.

Signed and Sealed this
Fourteenth Day of May, 2013

Teresa Stanek Rea
*Acting Director of the United States Patent and Trademark Office*